United States Patent [19]

Agelidis

[11] Patent Number: 4,866,848

[45] Date of Patent: Sep. 19, 1989

[54] INSTRUMENT FOR SUBDIVIDING ANGLES INTO HALVES, THIRDS OR FIFTHS

[76] Inventor: Alexander Agelidis, 252 Greenhills Rd., Bundoora, Victoria, 3083, Australia

[21] Appl. No.: 261,677

[22] Filed: Oct. 24, 1988

[51] Int. Cl.[4] .................................................. G01B 5/24

[52] U.S. Cl. ................................. 33/1 AP; 33/558.02

[58] Field of Search .............. 33/1 AP, 558.02, 558.03

[56] References Cited

U.S. PATENT DOCUMENTS

| | | | |
|---|---|---|---|
| 381,049 | 4/1888 | Yanez | 33/1 AP |
| 546,336 | 9/1895 | Köppen | 33/1 AP |
| 1,010,612 | 12/1911 | Garinger | 33/1 AP |
| 1,109,479 | 9/1914 | Steed | 33/1 AP |
| 2,222,853 | 11/1940 | Neurohr | 33/1 AP |
| 2,450,167 | 9/1948 | Robinson | 33/1 AP |
| 2,892,586 | 6/1959 | Graham | 33/1 AP |
| 3,224,097 | 12/1965 | Izumi | 33/1 AP |
| 3,693,261 | 9/1972 | Moore | 33/558.02 |
| 3,919,777 | 11/1975 | Moore | 33/1 AP |

*Primary Examiner*—William A. Cuchlinski, Jr.
*Assistant Examiner*—Diego F. F. Gutierrez

[57] ABSTRACT

A simple drawing instrument for the subdivision of angles into halves, thirds and fifths comprises two planar pieces connected at a pivot point. Each piece has three curved edges, being the external edge of the part and the two edges of a curved slot within the part. The pieces can be rotated within their planes relative to each other. The instrument is operated by placing the axis of the pivot at the apex of the given angle, and positioning the reference markings on the two parts so they lie along the sides of the angle. The intersections of various curved edges of the two parts define the points that subdivide the angle into halves, thirds and fifths.

2 Claims, 2 Drawing Sheets

INSTRUMENT FOR SUBDIVIDING ANGLES INTO HALVES, THIRDS OR FIFTHS

SUMMARY

This simple drawing instrument is used for the subdivision of angles into halves, thirds and fifths. It consists of two curved planar pieces connected at a pivot point. The two parts are rotated about the pivot so that a line on each lies along each side of the angle, and the intersection points of different curved edges of the two parts define the center-, third- and fifth-points of the angle.

DRAWINGS

DESCRIPTION

The division of an arbitrary angle into thirds or fifths cannot be conveniently accomplished by geometrical construction. This instrument provides a simple means of so dividing an angle.

Figure 1:
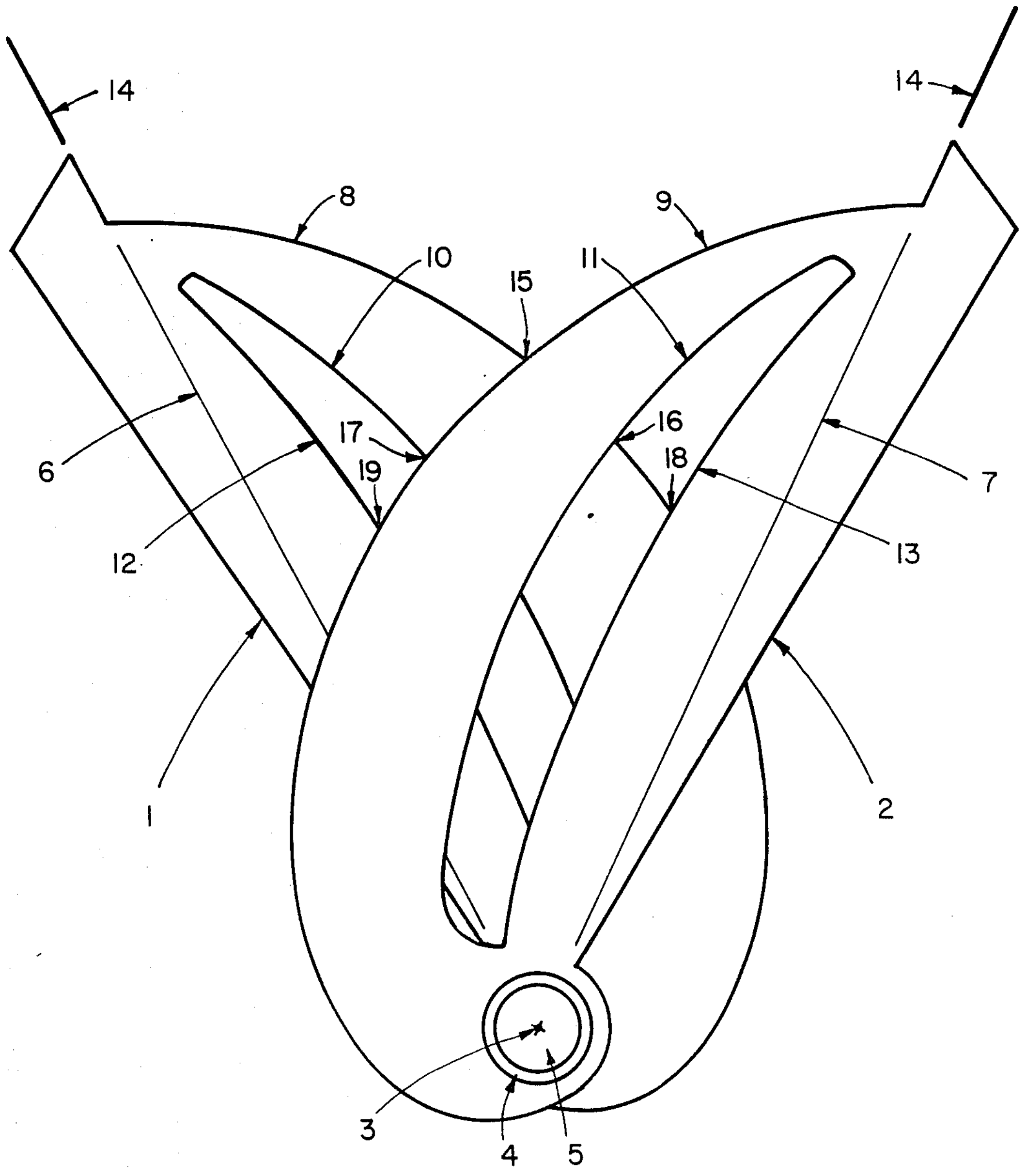
FIG. 1 is a plan view of the instrument

It consists of two appropriately shaped planar parts (1, 2) connected by a pivot (4) which allows them to be rotated which their plane relative to each other. The pieces are constructed of relatively thin, transparent material and are cut to a curved shape similar to that shown in FIG. 1. The pivot may be in the form of a metallic ring (4) which encloses a transparent disk (5) on which is marked the axis of the pivot point (3). Each planar piece has a reference line or other marking on it (6,7) whose projection passes through the pivot point.

Operation

This axis of the pivot is placed on the apex of the angle to be subdivided and the straight lines (6, 7) marked on each planar part are placed so as to lie along the sides of the angle (14). The intersection of the outer curved edges of the two parts (8, 9) define a point which bisects the angle (15). The intersection of the outer curved edge of one part and the outer edge of the curved slot of the other part (8 & 11 and 9 & 10) define the two points which trisect the angle (16, 17). The intersection of the outer edge of the curved slot of one part and the inner edge of the curved slot of the other part (8 & 13 and 9 & 12) define the two points which are one-fifth of the angle from either side (18, 19). The instrument can then be repositioned so that the pivot remains at the apex of the angle and the two straight lines (6, 7) pass through these points (18, 19). The remaining angle (which is three-fifths of the original angle) can then be trisected as described above, to complete the division of the original angle into fifths.

Manufacture

Figure 2:
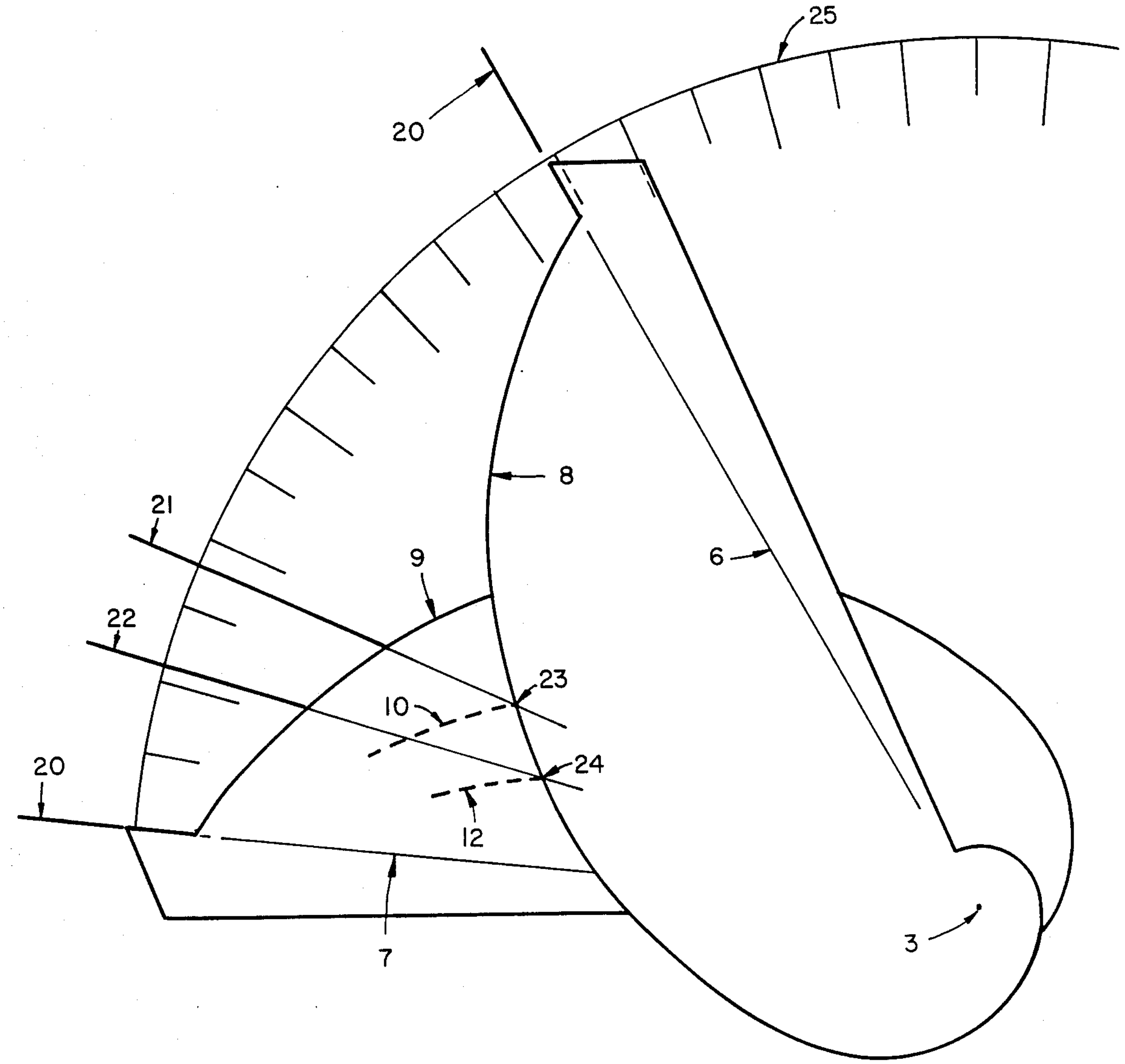
FIG. 2 is a plan view of the templates used to define the shapes of the curved edges of the instrument

In order for the instrument to function properly, the shapes of all the curved edges must be accurately and appropriately defined prior to its manufacture. The following is a brief description of one possible method for defining the shapes of the two planar parts. The two parts are symmetric relative to each other; the construction can, therefore, be carried out for one part and then reproduced on the other. All the curved shapes are interdependent, and it is most convenient to select first the shape of the outer curved edges (8, 9) of each planar part. These can be somewhat arbitrarily chosen for convenience and elegance. In the arrangement shown in FIG. 2, the outer curved edges are approximately or exactly a mathematical spiral.

To determine the shapes of the curved edges of the slots, templates of the two planar parts are made from thin transparent material. At this point the templates represent only the exterior curved edges of the parts (8, 9), the straight lines (6, 7) and the pivot point (3). The templates are positioned on a protractor (25) (or other similar instrument on which angles are accurately marked) with their pivot points at the center of the protractor and the sides of the templates opened to angles of increasing size, for example (20); the intersection points of the line defining the third (21) and fifth (22) of the angle and the curved outer edges (8, 9) are marked on each piece (points 23, 24); the loci of these intersection points define the shapes of the two curved sides (10, 12) of the slot.

I claim:

1. A drawing instrument for the subdivision of any angle into halves, thirds or fifths comprising:

(a) two planar pieces of thin transparent material, each of said planar pieces having three curved edges, said edges being the external edge of the piece and the two edges of a curved slot within the piece, (b) a pivot which connects the two planar pieces and allows them to rotate relative to each other within their planes, (c) markings on the two planar pieces which enable accurate positioning of the pieces along the sides of an arbitrary angle.

2. A method for using the drawing instrument for the subdivision of any angle into halves, thirds or fifths as stated in claim 1, said method comprising the steps of placing the pivot of the instrument at the apex of the given angle, aligning the reference marks on each planar piece with the sides of the angle, and marking off the intersection points of appropriate edges of the instrument to define points that subdivide the angle into halves, thirds or fifths.

* * * * *